United States Patent [19]

Redd

[11] Patent Number: 5,464,277

[45] Date of Patent: Nov. 7, 1995

[54] ADAPTOR HUB FOR AUTOMOTIVE WHEEL ORNAMENTS

[76] Inventor: Kevin D. Redd, 231 River Bend Rd., Dawsonville, Ga. 30534

[21] Appl. No.: 183,481

[22] Filed: Jan. 18, 1994

[51] Int. Cl.[6] ............................................. B60B 7/06
[52] U.S. Cl. .................................. 301/108.4; 301/37.37
[58] Field of Search ........................... 301/37.1, 37.37, 301/37.38, 105.1, 108.1, 108.4, 108.5, 111, 112, 114, 35.62, 35.63, 36.1

[56] References Cited

U.S. PATENT DOCUMENTS

| | | | |
|---|---|---|---|
| 3,170,733 | 2/1965 | Lamme | 301/37.1 |
| 4,070,066 | 1/1978 | Reppert et al. | 301/36.1 |
| 4,138,160 | 2/1979 | Lohmeyer | 301/108.1 |
| 4,217,002 | 8/1980 | Simpson | 301/37.1 |
| 4,944,562 | 7/1990 | Garrison | 301/111 |
| 5,031,965 | 7/1991 | Buerger | 301/37.37 |
| 5,090,777 | 2/1992 | Li | 301/37.37 |
| 5,152,584 | 10/1992 | Maxwell, Jr. | 301/37.37 |
| 5,352,026 | 10/1994 | Snook | 301/105.1 |

*Primary Examiner*—Russell D. Stormer
*Attorney, Agent, or Firm*—Kenneth S. Watkins, Jr.

[57] ABSTRACT

An adaptor hub for attaching wheel ornaments is disclosed for use on wheels which are attached to the brake assembly by conventional lugs and lug nuts. The adaptor is attached to the wheel by threaded fasteners radially spaced about the wheel hub. A wheel ornament is threaded onto the adaptor. An adaptor cover is retained by the wheel ornament.

8 Claims, 2 Drawing Sheets

ADAPTOR HUB FOR AUTOMOTIVE WHEEL ORNAMENTS

BACKGROUND

This invention relates to a device which facilitates attachment of ornaments to automotive wheels. The growth of interest and value to vintage and classic automobiles, especially sports and touring automobiles, has led to an increasing interest and market for automotive products which provide the classic look of, and retain the distinctive features of, these automobiles.

An area of keen interest has been the wheel style and particularly the "knock-off" style wheel used in racing, sports, and touring cars. The use of a single center "knock-off" hub nut significantly reduces the time required to remove and replace the wheel, an important factor in races and rallies. However, the "knock-off" hub is less reliable than the use of a number of wheel lugs and nuts used in conventional automotive wheels, especially for the motoring public which is unaware of the potential hazards of the "knock-off" wheels.

Many unfortunate accidents have occurred utilizing these wheels, especially by owners and drivers less experienced in automotive performance equipment and its maintenance. The center "knock-off" locking hub has become loose and come off during driving resulting in loss of control of the vehicle. Conventionally attached wheels, utilizing several lugs and nuts to attach the wheel to the brake assembly, offer additional warning and backup if one of the fasteners becomes loosened or fails.

For the general driving public, this situation has resulted in incorporating a number of devices including attaching devices or adaptor hubs and wheel ornaments to simulate the look of the "knock-off" wheel design on conventionally attached wheels. However, most of these devices suffer from being less than realistic in appearance. Other devices have adaptor hubs which utilize the wheel lugs or bolts to attach the adaptor to the wheel, requiring the removal of the lugs or bolts to remove the adaptor hub. U.S. Pat. No. 4,217,002 to Simpson and U.S. Pat. No. 3,170,733 to Lamme are examples of devices which require removal of the wheel lug nuts to remove the adaptor hub.

A particular need is in the case of the 1963 to 1966 Corvette whose owners wish to use the later conventionally attached wheels for safety yet retain the classic appearance of the "knock-off" wheel. Although the brake assemblies of the 1963 to 1966 Corvettes were supplied with conventional wheel lugs, the manufacturer supplied conversion hubs which bolted to the wheel lugs and allowed use of a competition wheel which could be attached with a "knock-off" locking hub. Later a wheel was supplied with lug holes so the wheel would be attached in the conventional manner without the conversion hub. Although the wheel was supplied with an attachment method for a hubcap to cover the center of the wheel, the hubcap lost the aesthetic appeal of the "knock-off" method. Therefore, owners of this valuable collectors automobile must choose between utilizing a wheel attachment method which is intended for competition and may introduce risks for unexperienced owners, or use a safer conventional attachment means which is aesthetically unpleasant and lowers the value of the automobile.

SUMMARY

My invention allows use of the conventional wheel attachment method, yet retains the authentic look of the "knock-off" wheel attachment method. My invention utilizes an adaptor hub for attaching a wheel ornament such as a actual "knock-off" locking hub to a wheel and utilizes conventional lug and lug nuts for attaching the wheel to the brake assembly. The adaptor hub is attached to the wheel independently of the lugs or lug nuts. Threaded fasteners are inserted in attachment holes spaced radially around the center of the hub adaptor and secure the adaptor hub to the wheel. The adaptor hub also has through holes located at the wheel lug locations and with a diameter large enough to attach and torque the lug nuts on the lugs. The adaptor hub is threaded on the outboard end to receive a "knock-off" locking hub. The device also includes a decorative hub cover with an annular opening which is secured by placing the cover over the hub before attaching the "knock-off" hub.

My invention results in an aesthetically pleasing wheel which utilizes a safe, conventional wheel mounting method. The adaptor hub and "knock-off" hub are securely attached and can be removed without loosening or removing the wheel lugs or nuts.

Although it is specifically designed to attach the actual "knock-off" hub for a 1967 or later Corvette wheel when attached to the brake assembly using conventional lug nuts, my invention could be used on other wheels which have, or could have added, drilled and tapped holes in the wheel for attachment of an adaptor hub.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
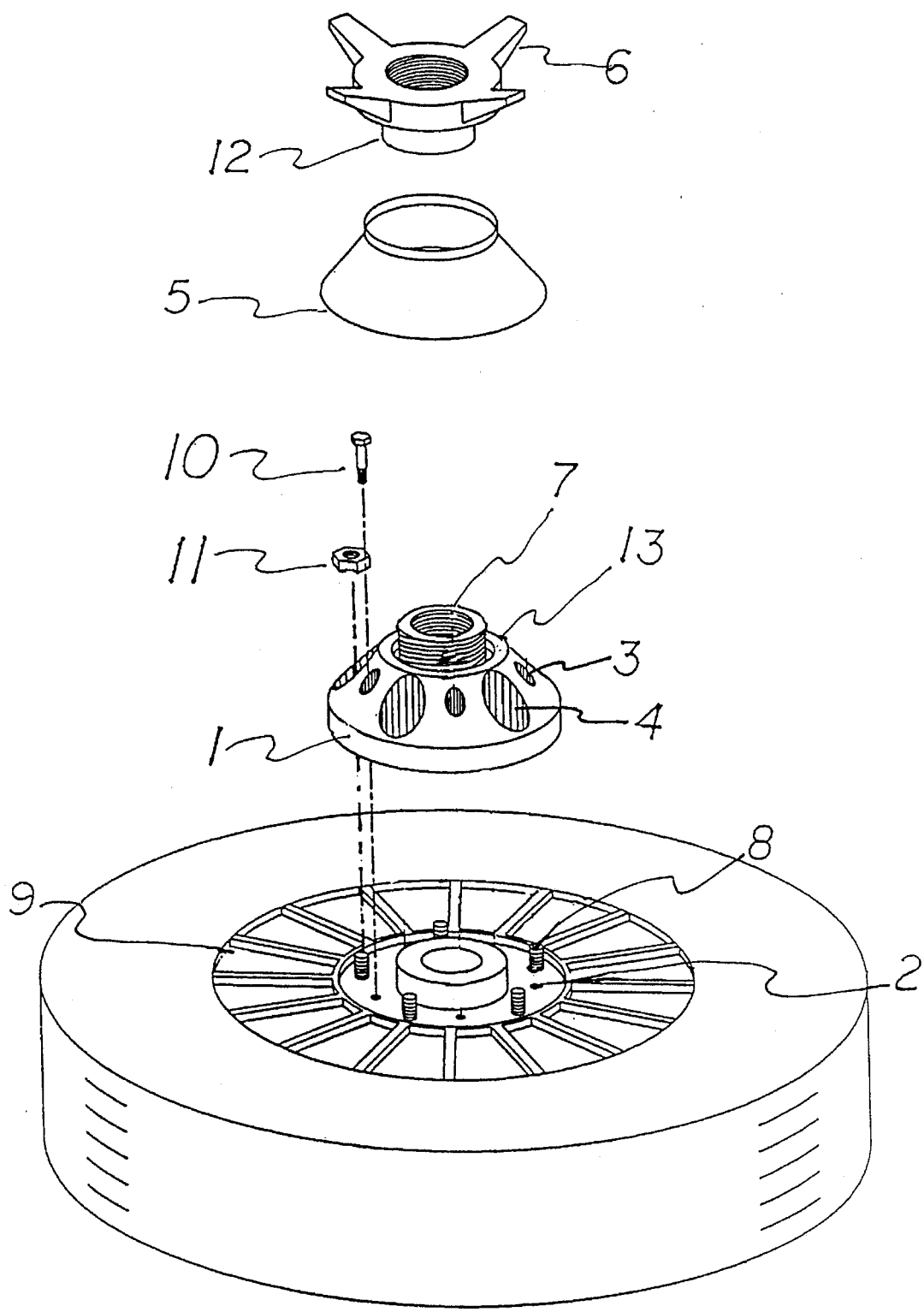
FIG. 1 shows an assembly drawing of the present invention.

FIG. 1 is an assembly drawing of a device which will allow installation of a wheel ornament on a wheel installed with conventional wheel lugs and nuts. The adaptor hub 1 is machined or cast from a durable material such as aluminum, magnesium alloy, or steel, and has two sets of radially spaced holes 3 and 4. Adaptor hub attachment holes 3 are counterbored to accept a threaded fastener 10 such as a bolt, machine screw, or a socket head cap screw. The adaptor hub 1 covers the center of the wheel and is attached by fasteners 10 threaded into a drilled and tapped holes 2 in the wheel 9. Lug nut access holes 4 are spaced so the centerline of lug nut access holes 4 are aligned with the centerlines of the wheel lugs 8. Lug nut access holes 4 are through drilled and of a diameter larger than the head of a wheel lug wrench or socket whereby lug nuts 11 can be installed and tightened with a wheel lug wrench when the adaptor is installed on the wheel.

The inboard end of hub adaptor 1 may be recessed in the center to allow clearance for the wheel bearing dust cap, or other wheel or wheel hub interferences.

Figure 2A:
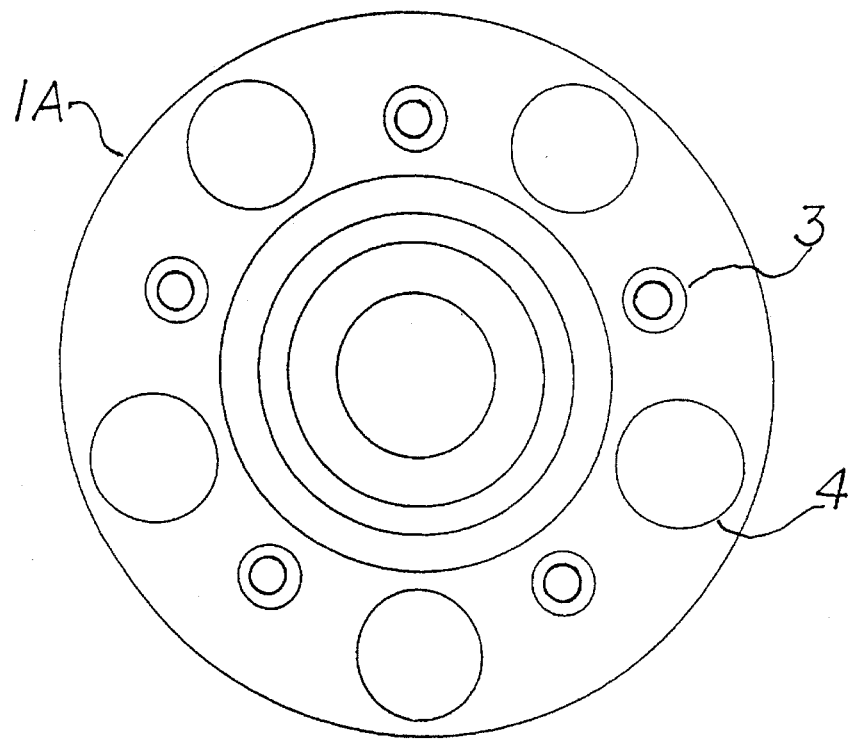
FIG. 2A is a plan view of the adaptor hub.
Figure 2:
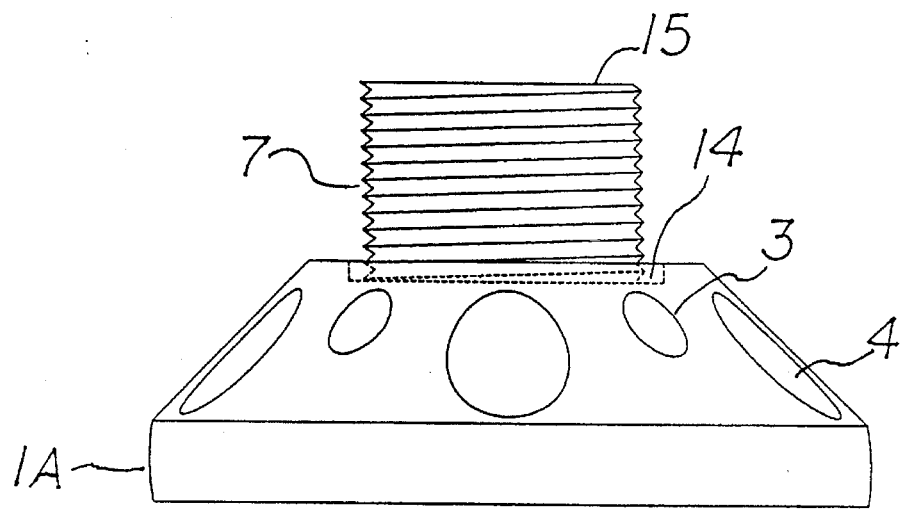
FIG. 2 shows an elevation view of an alternate embodiment of the adaptor hub.

The wheel ornament 6 is threaded onto ornament threads 7 of adaptor hub 1. Ornament threads may be integrally machined with the adaptor hub 1. FIG. 2 shows an alternative embodiment with threads 7 machined on a sleeve or journal 15 which is secured to adaptor hub 1A by interference fit 14. Ornament attachment threads may be machined on a sleeve or journal and secured to the adaptor hub by means of an interference fit 14 (FIG. 2). The threads may be machined to match an actual "knock-off" locking hub as in the case of a 1963–1966 Corvette or to match the internal threads of other standard or special wheel ornaments. The wheel ornament is threaded until its inboard face 12 contacts the outboard face 13 of the adaptor hub 1. Torquing of the ornament will normally be adequate to prevent the ornament from loosening. Ornament torquing is not critical for safety because the ornament does not affix the wheel to the vehicle. Additional protection from loosening may be accomplished by using set screws or pins which engage the hub adaptor and wheel ornament.

In its preferred embodiment, hub cover 5 is used to improve the aesthetic appearance of the assembly by covering the adaptor hub. The cover is retained on the wheel by the wheel ornament 6. The shape and appearance of the hub cover can be modified to suit the application.

In its preferred embodiment, adaptor hub 1 is machined from aluminum to reduce unsprung weight. The ornament threads 7 are machined in a steel sleeve and assembled to adaptor hub 1 with an interference fit 14. Hub cover 5 is spun aluminum or stainless steel.

In the case of lug attached wheels for a Corvette, drilled and tapped holes 2 already exist. Attachment holes 3 on adaptor hub 1 align with holes 2 on wheel 9. Threaded fasteners 10 with threads matching the thread of holes 2 secure the adaptor hub 1 to the wheel 9. Ornament thread 7 is made to accept the actual "knock-off" locking hub used with the conversion hub, resulting in an authentic replica of the actual "knock-off" wheel "look" while providing the safety of a conventional lug mounted wheel.

Although the device is specifically designed for use on wheels already having a threaded engagement means such as drilled and tapped holes in the wheel which could be used for attachment of the adaptor hub, the present invention could be used as well on any vehicle wheel in which such an attachment means could be safely added.

I claim:

1. An adapter hub for automotive wheel ornaments, the adapter hub covering the center portion of the wheel and comprising:

an adaptor hub attachment means for attaching the adaptor hub to a wheel, the attachment means comprising a plurality of openings for threaded fasteners, the threaded fasteners engaging internal threads in the automotive wheel;

a plurality of lug openings having through diameters sufficiently large wherein a wheel lug nut can be inserted and torqued through the lug openings for engaging a wheel to a wheel brake assembly;

a wheel ornament attaching means for attaching a wheel ornament to the hub; and an adaptor hub cover.

2. The hub of claim 1 wherein the adaptor hub cover comprises an annular opening and is retained over the adaptor hub by the ornament when the ornament is attached to the adaptor hub by the wheel ornament attaching means.

3. An adapter hub for an automotive wheel, the hub covering the center portion of the wheel and comprising:

a plurality of counterbored openings for threaded fasteners, the threaded fasteners being independent of the wheel lugs, the threaded fasteners engaging internal threads in the automotive wheel;

a plurality of lug openings comprising through diameters sufficiently large wherein a wheel lug nut can be inserted through the lug openings for engaging a wheel to a wheel brake assembly; and a wheel ornament attaching means for attaching a wheel ornament to the hub.

4. The hub of claim 3 wherein the wheel ornament attaching means comprises a screw thread for attaching a wheel ornament to the hub.

5. The hub of claim 4 comprising a "knock-off" hub nut, the nut engaging the screw thread.

6. The hub of claim 3 additionally comprising an adaptor hub cover.

7. The hub of claim 4 wherein the adaptor hub cover comprises an annular opening and is retained over the adaptor hub by an ornament when the ornament is attached to the adaptor hub by the wheel ornament attaching means.

8. The apparatus of claim 5 comprising an adaptor hub cover, the cover comprising an annular opening and retained over the adaptor hub by the hub nut when the hub nut is attached to the adaptor hub by the screw thread.

* * * * *